A. FISET.
HAY PRESS.
APPLICATION FILED JAN. 20, 1917.
1,265,185.
Patented May 7, 1918.
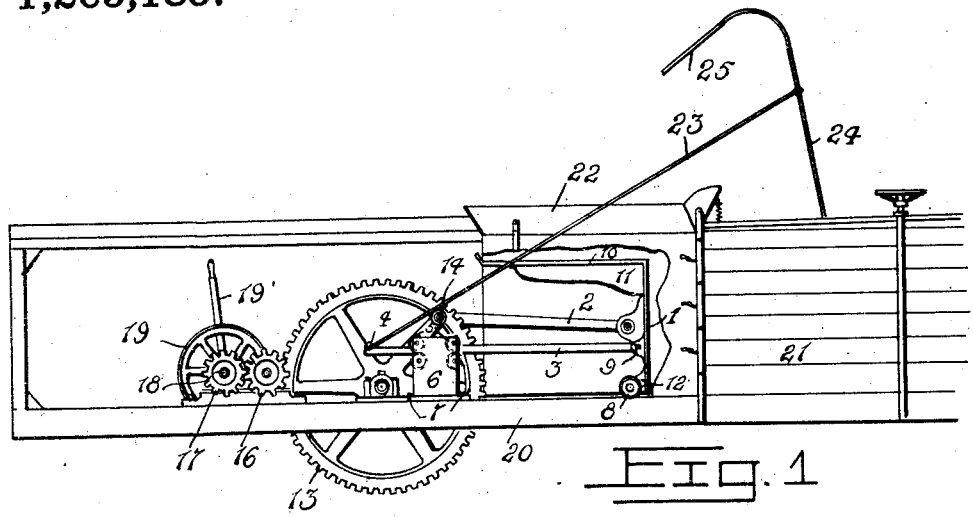
Fig. 1
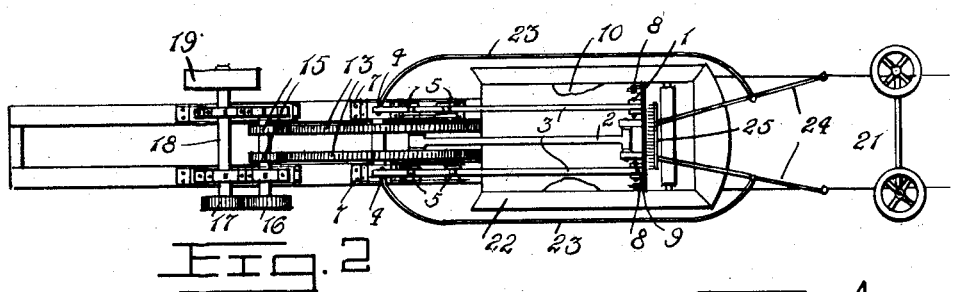
Fig. 2
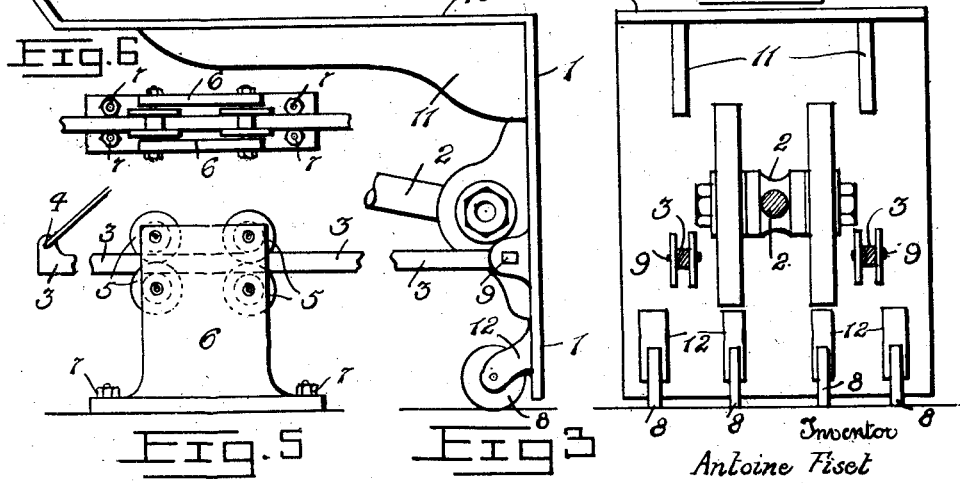
Fig. 6    Fig. 4
Fig. 5    Fig. 3
Inventor
Antoine Fiset
By William C. Linton.
Attorney

UNITED STATES PATENT OFFICE.

ANTOINE FISET, OF QUEBEC, QUEBEC, CANADA.

HAY-PRESS.

1,265,185.  Specification of Letters Patent.  Patented May 7, 1918.

Application filed January 20, 1917. Serial No. 143,517.

*To all whom it may concern:*

Be it known that I, ANTOINE FISET, a subject of the King of Great Britain, residing at Quebec, Province of Quebec, Canada, have invented certain new and useful Improvements in Hay-Presses; and I do hereby declare that the following is a full, clear, and exact description of the invention, such as will enable others skilled in the art to which it appertains to make and use the same.

The present invention relates to hay presses and more particularly to means for feeding hay to a press. An object of the present invention is to provide a device of this character whereby more rapid work and feeding and more uniform bales of hay will be accomplished.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a side elevation of a press having a portion thereof broken away and showing the invention applied thereto;

Fig. 2 is a plan view of a portion of the press showing the invention applied thereto and having a portion of the plunger broken away;

Fig. 3 is an enlarged detail side elevation of the plunger;

Fig. 4 is an end elevation of the same;

Fig. 5 is a side elevation of one of the supporting bearings; and,

Fig. 6 is a plan view of the same.

Referring now more particularly to the accompanying drawings wherein like and corresponding parts are designated by similar reference characters throughout the several views.

An ordinary hay press frame is herein provided which consists of a suitable support 20 having a press 21 arranged thereupon and a feeding hopper 22, whereby the hay when supplied to the hopper 22 will be forced within the press 21 in the usual manner. Adapted to reciprocate within the hopper 22 is a plunger 1 and this plunger has pivotally connected thereto a piston rod 2. Also pivotally connected as at 9 to the rear face of the plunger are the rods 3 and the opposite ends of these rods 3 have connected thereto as at 4 the links 23. Pivotally connected to the press frame are the supporting rods 24 carrying a fork 25. These rods 3 pass through the grooved rollers 5 journaled within the supports 6 and these supports are secured to the frame 20 by means of the bolts 7. Carried by the lower end of the plunger 1 are the bearings 12 in which are journaled the caster rollers 8 which travel along the bottom of the hopper, so as to permit the plunger to travel freely and avoid friction.

Formed with the upper end of the plunger 1 is a platform 10 and this platform is braced by means of the brackets 11. Journaled within suitable bearings upon the support 20 are stub shafts carrying the large gear wheels 13 and eccentrically connected to these gear wheels as at 14 is one end of the piston rod 2. These gear wheels are in mesh with the pinions 15 carried by a shaft also journaled upon the frame 20 and this latter shaft carries a gear 16 adapted to mesh with a gear 17 carried by the driven shaft 18. Adapted to be operatively connected through a suitable clutch mechanism (not shown) to the shaft 18 is a pulley 19 shown in Fig. 1 and this pulley is connected to a suitable motor power, whereby when the clutch is operated through the lever 19' (Fig. 1) the shaft 18 will also be rotated.

From the foregoing it is obvious that upon the rotation of the shaft 18 the gear wheels 13 will also be rotated and the plunger will in turn be reciprocated for forcing the hay as it is delivered to the hopper 22 to pass into the press 21 in the usual manner. As the plunger is reciprocated the fork 25 will be caused to raise and lower, thereby forcing the hay within the hopper. By providing the platform 10 the upper end of the hopper will be closed when the piston is in its innermost position, so as to prevent the hay from falling behind the piston.

Having thus fully described my invention, what I claim as new and desire to secure by Letters Patent is:

1. The combination with a hay press having a reciprocating plunger mounted therein, rods connected to said plunger, bearings for supporting said rods, a feeding fork, and links connecting said rods with said fork.

2. The combination with a baling press having a reciprocating plunger arranged therein, of a fork pivotally supported upon said press, means for reciprocating said plunger, a pair of rods secured to said plunger, bearings supported upon said press, grooved rollers journaled within said bearings, said rods adapted to pass between said grooved rollers, and links connecting said rods with said fork.

ANT. FISET, Fils.

Witnesses:
D. E. ARSENEAULT,
ALPHONSE NOËL.

Copies of this patent may be obtained for five cents each, by addressing the "Commissioner of Patents, Washington, D. C."